United States Patent [19]

Ghibu et al.

[11] 3,849,724

[45] Nov. 19, 1974

[54] METHOD AND APPARATUS FOR MEASURING THE GAP SPACING AND RELATIVE TRANSVERSE DISPLACEMENT OF AN ELECTROMAGNETIC CORE FROM AN ARMATURE USING MAGNETIC FIELD SENSORS

[75] Inventors: Michael Ghibu; Gerhard Bohn, both of Munich; Peter Schwarzler, Furstenfeldbruck, all of Germany

[73] Assignee: Krauss-Maffei Aktiengesellschaft, Munich, Germany

[22] Filed: Nov. 13, 1972

[21] Appl. No.: 306,035

[30] Foreign Application Priority Data
Nov. 17, 1971  Germany............................ 2157011

[52] U.S. Cl............. 324/34 D, 104/148 MS, 324/45
[51] Int. Cl.............................................. G01r 33/00
[58] Field of Search............ 324/34 R, 34 PS, 34 D, 324/34 FL, 34 H, 34 TK, 45; 104/148 MS

[56] References Cited
UNITED STATES PATENTS
3,304,615  2/1967  Ward et al...................... 324/34 TK
3,662,576  5/1972  Girlatschek...................... 324/34 TK
3,741,613  6/1973  Pfaler............................ 104/148 MS
3,764,895  10/1973  DiMarco......................... 324/34 FL FOREIGN PATENTS OR APPLICATIONS
198,692  6/1967  U.S.S.R. .......................... 324/34 TK

*Primary Examiner*—Robert J. Corcoran
*Attorney, Agent, or Firm*—Karl F. Ross; Herbert Dubno

[57] ABSTRACT

A system for measuring the gap spacing between two magnetic members of an electromagnetic arrangement in which, for example, an electromagnet core is spacedly juxtaposed with a ferromagnetic armature or rail. The system provides a main magnetic sensor responsive to the induction in the gap whose spacing is to be measured and whose output is a function of both the gap spacing and the energization current of the electromagnetic. An auxiliary sensor, whose output is a function of the energization current, is employed to allow the two signals to be electronically combined by analog, digital or hybrid circuitry including a divider, to produce an output which is a function of the gap spacing free from dependence upon the energization current.

10 Claims, 9 Drawing Figures

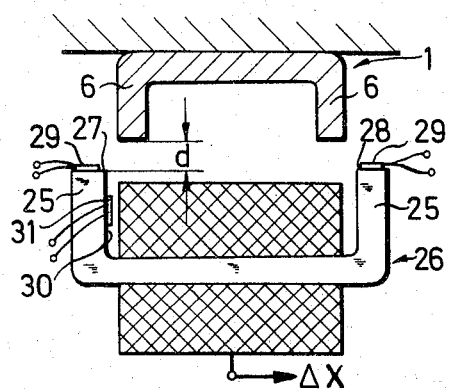
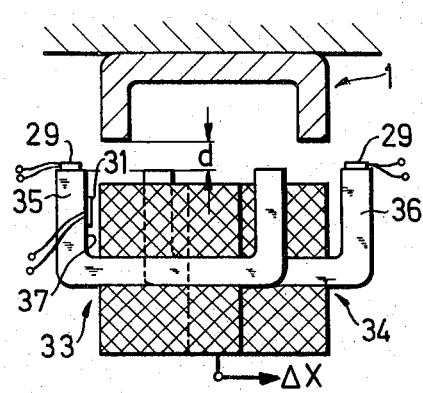
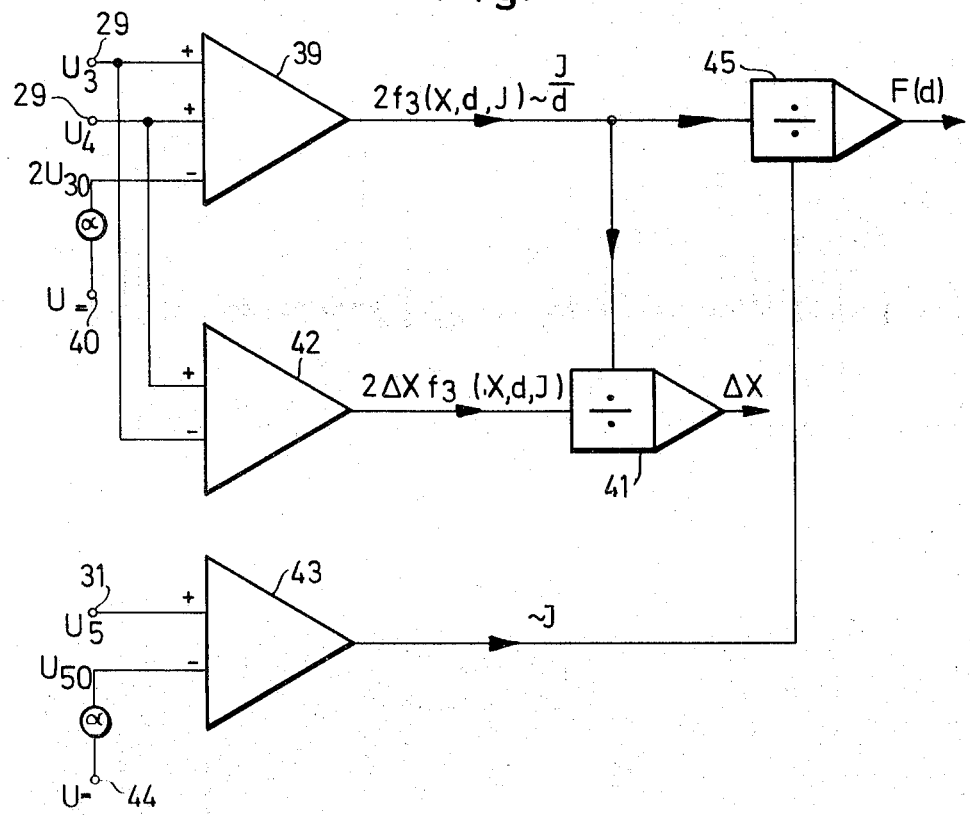

METHOD AND APPARATUS FOR MEASURING THE GAP SPACING AND RELATIVE TRANSVERSE DISPLACEMENT OF AN ELECTROMAGNETIC CORE FROM AN ARMATURE USING MAGNETIC FIELD SENSORS

BACKGROUND OF THE INVENTION

1. Field of the Invention

The present invention relates to a system (method of and apparatus for) detecting the gap spacing between a pair of magnetic members, e.g., an electromagnet core and a ferromagnetic armature. More particularly, the invention relates to improvements in electromagnetic suspension and/or guide systems, e.g., for high-speed vehicles, for indicating, measuring or controlling the gap spacing of the suspension or guide arrangements.

2. Background of the Invention

In recent years considerable effort has been directed into the development of high-speed vehicles in which frictional engagement between a vehicle and a support surface is minimized. Among the systems which have been proposed for this purpose are electromagnetic guide and electromagnetic suspension arrangements in which the vehicle carries one or more electromagnets and the support surface is a track, right-of-way or the like provided with an armature or rail of ferromagnetic material. A magnetic circuit is established through the magnetic members constituted by the electromagnet core and the armature rail, across the gaps between the two.

When the system is used for electromagnetic suspension, the gap is generally vertical and the magnetic field is sufficient to support the vehicle out of engagement with the surface against variations in vehicle loading. Since an increased load tends to increase the gap spacing in an attractive electromagnetic arrangement (or decrease the gap spacing in a repulsive electromagnetic arrangement), means must be provided to adjust the electromagnet energization to restore the desired gap spacing.

Similarly, where the electromagnetic arrangement is provided for guidance of the vehicle, e.g., to center the vehicle more or less upon its track against lateral forces, the gap extends generally in the horizontal direction and horizontal or transverse magnetic forces are created. As the vehicle negotiates a curve, centrifugal force may tend to increase or decrease the guide gap spacing and a similar tendency may arise with changes in transverse loading, e.g., as a result of wind action in the transverse direction. Here too an adjustment must be made of the electromagnet energization current to compensate for variations in gap spacing and/or to restore the optimum gap spacing.

It is common practice in such vehicle systems and elsewhere, when the spacing between two magnetic members is to be ascertained, to provide a sensor or measuring device responsive to the gap spacing; for example, the magnetic members may be provided with a spacing-measuring device of the capacitive type using the principle that the capacitance of two juxtaposed plates, one on each of the members, is a function of the distance between them. This system has the disadvantage that the output is a function of the dielectric constant of the gap and will vary, when used for vehicles as described above, with atmospheric conditions. Inductive sensors have also been provided, but these have not proved to be satisfactory heretofore because of the effect of stray magnetic fields upon such sensors.

OBJECTS OF THE INVENTION

It is, therefore, the principal object of the present invention to provide an improved system for the detection, measurement and evaluation of the gap spacing between a pair of magnetic members whereby the results are unaffected by environmental factors and, for the most part, also by stray magnetic fields.

Another object of the invention is to provide an improved method of and apparatus for the measurement, detection and control of a gap spacing between magnetic members such that external influences may be minimized and an accurate, reproducible and substantially linear result, in terms of gap spacing, is obtained.

Still another object of the invention is to provide an electromagnetic system with improved means for monitoring the gap spacing thereof.

An object of the invention also resides in the provision of a high-speed vehicle system in which the aforedescribed disadvantages are obviated.

SUMMARY OF THE INVENTION

The aforedescribed objects are attained, in accordance with the present invention, by a system for the measurement, detection and control of the gap between a pair of electromagnetic members, e.g., an electromagnet core and an armature spaced therefrom, which comprises producing a first signal which is a function of the magnetic field intensity in the gap and thus dependent upon both the energization current and the gap spacing, and at least one other signal which is a function of the magnetizing current but differs from the first signal, the two signals being algebraically combined, automatically, continuously and electronically in an analog, digital or hybrid electronic circuit including a divider to eliminate the energization-current dependency from the resulting output which is then a function substantially only of the gap spacing.

In method terms, therefore, the invention comprises the steps of producing a first signal representing the magnetic field intensity in the gap between the magnetic members, producing a second signal which is a function of the energization current of the electromagnetic members, and algebraically and electronically combining these signals to produce an output which is substantially only a function of the gap spacing between the magnetic members. According to the invention, the secondary signal may be only a function of the energization current through the electromagnet coil, may be a function of both the energization current and the gap spacing as long as this function differs from the functionality of the first or main signal, or may be a function of other parameters of the electromagnetic system in addition to energization current so as to improve the linearity of the output of the circuit with altered gap spacing.

In this case, a reproducible and error-free measurement of the gap spacing can be attained at relatively low cost.

In apparatus terms, the invention comprises a main sensor responsive to the induction of the main magnetic field between the magnetic members and preferably disposed in the gap, i.e., between at least one magnetic pole of the electromagnet core and the armature, the main sensor generating the first signal mentioned above; the apparatus also includes a second sensor responsive to the energization current and, possibly, to the gap spacing as well, the second sensor having in this case an output which is a different function of the gap spacing than the primary sensor. The output of this secondary sensor is electronically combined with the output of the primary sensor in an electrical circuit comprising analog, digital or hybrid elements to eliminate the energization-current dependency of the combined signal.

In this manner the gap-spacing dependency of the output signal is obtained free from the influences of other parameters of the electromagnetic guide and suspension systems, without the disadvantages of prior-art inductive and capacitive sensors. When the permeability of the iron of the armature and/or electromagnet core is substantially constant, i.e., the system operates in a substantially saturation-free state, practically no other variables, apart from those set forth above, enter into the amplitude of the output signal.

According to an important feature of the invention, the main sensor is a magnetic-electrical transducer responsive to the magnetic field intensity across the gap and producing an output which is a function of both the energization current and the gap spacing. The secondary sensor may respond to the stray magnetic field generated in the electromagnet core, the stray magnetic field being a function primarily of the energization current although it may also be a function of the gap spacing which, however, differs, from the functionality of the gap spacing of the main sensor. Alternatively, the secondary sensor may include an electrical-electrical transducer for directly translating the energization current into an output which can be electronically combined, as described, with that of the other sensor.

Since, as a first approximation, the induction of the stray field is a function only of the energization current, the alternative secondary sensor means act alike in eliminating, with the aid of the electrical circuit, the effect of the variable energization current upon the output.

Where the sensor is directly responsive to current flow through the electromagnet coil, it may be constituted as a shunt having a low resistance and across which a voltage is developed which is proportional to the current flow through the coil.

While the solution described above to the problem of obtaining an output which is proportional to the gap spacing of the magnetic members and free from any significant dependency upon the energization current is, to a first approximation, solved by the apparatus described above, a complete elimination of the energization-current dependency cannot always be obtained by measurement of the stray magnetic field using a secondary magnetic-electrical transducer as described. This is a consequence of the fact that the permeability of the magnetic members, even in a saturation-free condition, is not always constant because additional factors of powers of the energization current can be detected in the stray magnetic field and cannot be simply eliminated therefrom. Where the energization-current dependency of the stray field intensity is small, these factors can be disregarded and the secondary magnetic-field detector used to supply the signal which is combined with the main signal in the analog or other circuit forming the algebraic combination of the two outputs. However, when the factors attributed to the energization current are capable of introducing large deviations from linearity in the output of the system when a stray magnetic field detector is employed, it is preferred to make use of the more direct system for ascertaining the energization current, namely, the aforementioned shunt. It may be pointed out, in this regard, that the stray magnetic field is seldom only a function of the energization current and is frequently also a function of the gap spacing whose measurement is desired. Thus as the gap is reduced in width, the stray magnetic field is reduced in amplitude. The system remains operative, however, because the variation of the stray magnetic field with gap width follows a different function than the variation of the main magnetic induction as detected by the primary sensor.

It has been found to be advantageous, when it is desired to use a stray magnetic-field sensor, in accordance with the principles of this invention, to provide an auxiliary magnetic path or magnetic circuit, in addition to the main magnetic circuit in which the main field sensor is disposed. This secondary magnetic circuit may be provided with a gap which can approximate the optimum gap of the magnetic members. When the variation in the gap width in the main magnetic circuit is small, as is generally the case where the system is used for electromagnetic suspension or guidance, the auxiliary gap approximates the main gap and the stray magnetic field detector can be located in the auxiliary gap so that its output is inversely proportioned to the main gap width and to the energization current without much of the effects of the other factors mentioned above. The use of the auxiliary magnetic circuit, which may include magnetically conductive members defining the auxiliary gap and connected to the pulse of the electromagnet core, has the additional advantage that the output of the stray magnetic-field detector and its relationship to the measured parameters and the output of the main magnetic field detector is substantially independent of the degree of magnetic saturation of the magnetic members. This system is capable of providing an output representing the main gap spacing which is highly linear and free from influences by extraneous factors.

According to an important feature of the present invention, the magnetic system in which the sensors are connected, form part of a magnetic suspension and/or guide system a high-speed vehicle. In the case of an electromagnetic suspension, a plurality of such electromagnets, generally with cores of a U-cross-section, can be provided upon the vehicle and juxtaposed with the U-section armature rail mounted upon a track or support along which the vehicle travels. The magnetic field produced by the electromagnets, bridges the gaps between each electromagnetic core and the rail and balances the weight or load of the vehicle. As the loading of the vehicle increases, there is a tendency toward increasing gap width which is detected, in accordance with the present invention, and the output of the detection system used to adjust the energization current to restore the optimum gap width. Generally the magnetic field is attractive and tends to draw the vehicle upwardly. When the system is used for electromagnetic guidance, the U-section rail may be turned laterally and juxtaposed with laterally open U-section electromagnets applying a horizontal or transverse force to the vehicle to maintain the latter centered on the track. Here the changes in spacing are due in part to the transverse forces of wind, centrifugal operation and the like and are equally resisted by the measurement system of the present invention.

When the electromagnetic core and armature have substantially U-section configurations whereby the free ends of the arms of the U's approach one another, the relative displacement of one magnetic member with respect to the other in the transverse direction, i.e., perpendicular to these arms, is possible since the vehicle or the electromagnetic system as a whole affords this degree of freedom of movement. In such cases it has been found to be advantageous to provide the magnetic-field incoming pole of at lease one electromagnet and the magnetic-fied outflowing pole of the same or another electromagnet with respective main field sensors, the outputs of which are algebraically combined with the result being algebraically combined with the output of a stray magnetic-field sensor.

It has been found to be advantageous, in some cases, to provide a number of electromagnets in longitudinally offset relationship along a common armature rail and to transversely stagger these electromagnets from side to side. In this case, the electromagnets may be energized in common or at least in pairs with one pole of one electromagnet to one side of the armature and a pole of the other electromagnet to the opposite side of the armature rail being coupled to provide the main field signal which is combined with the stray field signal, the latter being derived from at least one of the two commonly energized electromagnets. In this case, means is provided to generate the algebraic sum and the algebraic difference of the two main field signals and the lateral deflection of the magnetic members is eliminated from any effect upon the output of the system while a measure of such deflection is also obtained as a further output, e.g., to control other magnetic members. In other words, algebraic combination of the outputs of a pair of magnetic sensors to each side of a common armature or rail, is used to eliminate any dependency of the output of the system upon transverse movement of the magnetic members. When two substantially identical and commonly energized electromagnets, one behind the other and with a transverse offset, are employed, the transverse dependency of the difference signals is correspondingly greater than when the two sensors are provided on a single electromagnet. In this case it is possible to obtain an output, via the signal difference which is substantially only a function of transverse freedom of movement and utilizes this enhanced transverse-displacement signal for other purposes while the signal sum is used to eliminate the transverse dependency of the main magnetic field signal which is combined with the stray magnetic field signal to derive the output proportional to gap spacing.

Since the induction of the main magnetic field is, to a first approximation, directly proportional to the energization current and inversely proportional to the main gap spacing, and the induction of the stray magnetic field is to a first approximation proportional only to the energization current, the electronic circuitry need merely include a divider forming the quotient of the stray field signal and the main field signal to eliminate the current dependency and produce an output which is substantially exclusively a function of gap spacing.

This ideal case is seldom realized since, as noted, the amplitudes of the main and stray magnetic fields may be materially different, the sensitivities of the sensors may vary and the sensors may have superimposed on their outputs substantially constant signal components which are independent of the variables of interest. Accordingly, it is preferred to provide electronic adders (summers) capable of abstracting any constant or superimposed signal from each or both outputs and/or coefficient multipliers capable of augmenting the two signals to bring them into closer agreement by multiplication by a constant value, such that the output will more accurately represent the gap spacing. The means for forming the algebraic sums and differences mentioned earlier may likewise consist of adders the output of which are applied to an analog or other divider. The magnetic field sensors may be Hall generators (Hall-effect crystals), field plates, magnetic diodes or simple induction coils.

DESCRIPTION OF THE DRAWING

The above and other objects, features and advantages of the present invention will become more readily apparent from the following description, references being made to the accompanying drawing in which:

FIG. 5 is a cross-sectional view through a suspension system in which the effect of lateral displacement on the output is nullified;

FIG. 6 is a view similar to FIG. 5 and in diagramatic form for an arrangement in which a pair of longitudinally spaced and laterally offset electromagnets are used;

FIG. 7 is a circuit similar to FIG. 4 utilizing the more complex input arrangement of, for example, the sensors of FIG. 6;

SPECIFIC DESCRIPTION a. Basic Vehicle Arrangement

Figure 8:
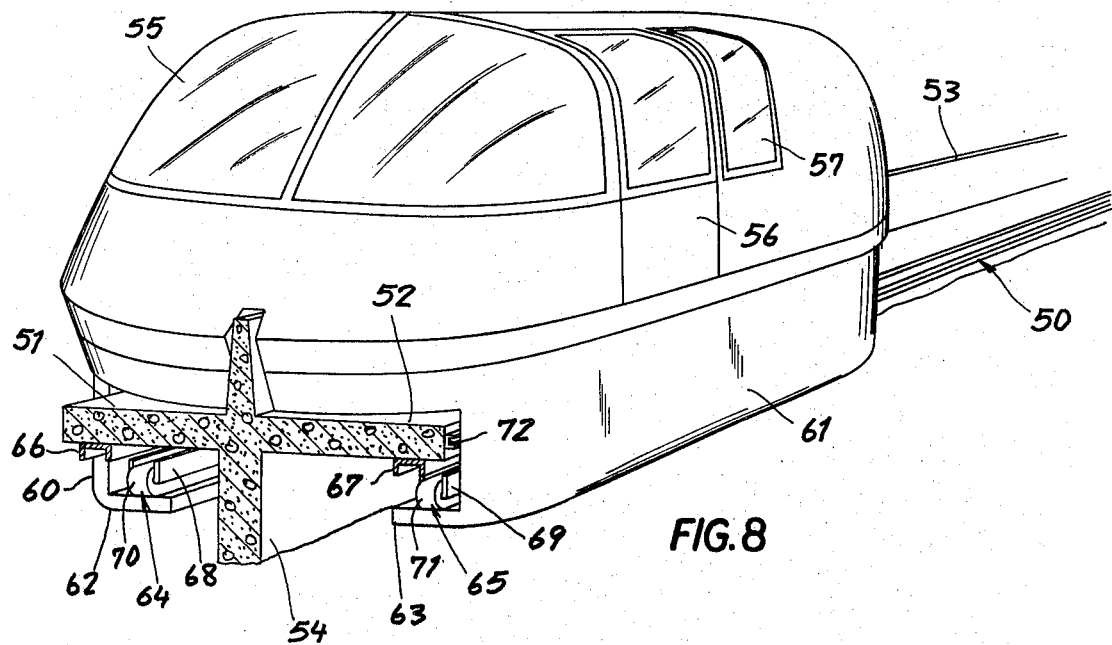
FIG. 8 is a diagrammatic perspective view, partly broken away, of a vehicle embodying the system for measuring gap spacing according to the present invention.

The present system for measuring the gap spacing between a pair of electromagnets, while applicable to any electromagnet arrangement in which an electromagnet core or yoke is spacedly juxtaposed with an armature, is preferably employed in a vehicle system of the type illustrated in FIG. 8. In this arrangement, the vehicle 55 travels along a track 50, here shown to have a generally T-shaped cross-section and to be supported on pylons (not illustrated) at spaced locations therealong. The vehicle 55 may have a door 56 opening into the passenger compartment 57 and is provided in the conventional manner with a drive means for propelling the vehicle along the track. The track 50 comprises a pair of horizontally extending flanges 51 and 52, forming the crossbar of the T, and a vertical web 54 extending downwardly from the cross-bar. Additional guidance and stability may be provided by an upstanding web 53 rising from the crossbar of the T and, for example, engaged by the vehicle drive or provided with electric-supplying rails engageable by shoes (not shown) on the vehicle.

The vehicle body 55 is provided with a pair of downwardly extending aprons 60, 61 having inwardly turned flanges 62, 63 and carrying the electromagnetic suspension and guide means of the vehicle. The flanges 62 and 63 may each carry electromagnets 64 and 65 juxtaposed with armature rails 66 and 67 respectively. The armature rails 66 and 67 are of downwardly open U cross section and are composed of a ferromagnetic material, e.g., iron and steel, extending continuously along the undersides of the flanges 51 and 52 of the T while being affixed thereto. The electromagnets 64 and 65, which are mounted upon the aprons 60 and 61, each comprise an upwardly open U-section magnetic core 68, 69 whose upwardly turned poles or shanks are juxtaposed with the downwardly turned shanks of the respective armature rail as illustrated generally in FIG. 1 or FIG. 2. The web of the electromagnet core 68, 69 is wrapped with a coil 70, 71 which, when energized, generates a magnetic flux in the respective core, the flux path closing in part through the opposing armature and the two air gaps separating it from the electromagnet core. As the load of the vehicle tends to increase, the downward force likewise increases and the electromagnetic force must be correspondingly increased to maintain the vehicle electromagnetically suspended.

The flanges 51 and 52 may also be provided with lateral rails, one of which has been shown at 72, cooperating with respective electromagnets, for centering the vehicle against lateral displacement as caused, for example, by centrifugal force (as the vehicle negotiates a curve) or wind forces. The vehicle is provided with a sensor responsive to the magnet gap spacing to advise the vehicle operator or automatically maintain an optimum gap spacing by adjustment of the field intensity of the corresponding electromagnet. A circuit for this purpose is illustrated in, and described with reference to, FIG. 9. The sensor arrangement may be any one of those described in connection with FIGS. 1 – 7.

b. Magnetic Gap Sensors and Operation

Figure 1:
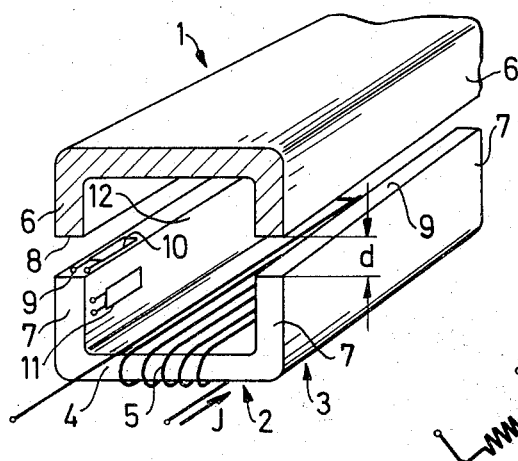
FIG. 1 is a fragmentary perspective view of an electromagnetic suspension or guide system embodying the present invention, portions of the system being illustrated diagrammatically.

FIG. 1 illustrates a suspension guide system which may be used in the arrangement of FIG. 8 to control any of the electromagnets thereof, and which comprises a fixed aramature rail 1 of U-shaped profile and an elongated electromagnet 2 having a similarly U-shaped core 3 whose yoke 4 carries an energizing coil 5.

When the coil 5 is energized, a magnetic field is generated in the electromagnet 2 to draw the electromagnet toward the armature rail and suspend to guide the vehicle in a contactless manner with a gap spacing $d$ between the electromagnet members. In this case, the lateral shanks 6 of the armature rail 1 are juxtaposed with the lateral shanks 7 of the core 3 and have pole faces 8 and 9, respectively, which are spacedly juxtaposed by the aforementioned distance $d$. As already noted, the electromagnet 2 is fixed to the vehicle body (e.g., as shown in FIG. 8) which is placed in a generally contactless manner parallel to the track upon which the armature rail 1 is mounted.

The actual spacing $d$ is measured in accordance with the present invention by a main field sensor 10 and a stray field sensor 11, the sensors being constituted as Hall-effect generators or crystals, magnetic diodes or field plates. The main field sensor 10 is provided directly between a pair of pole surfaces 8, 9 and preferably on the pole surface 9 of the electromagnet core 3 so that it is traversed by the full intensity of the suspending or guiding magnetic field. In the embodiment illustrated in FIG. 1, the stray field sensor 11 is provided on an inner surface 12 of one of the lateral shanks 7 of the magnetic core 3 so that it responds to the stray magnetic field bridging the shanks 7. When field plates are provided to indicate the magnetic field intensities, it is possible to derive an output proportional to the resistance of the field plate while the active sensors such as Hall generators or magnetic diodes, with conventional energizing circuitry, supply a magnetic-field intensity-dependent voltage directly.

When the iron of the electromagnet is unsaturated, the main magnetic field induction is, to a first approximation, proportional only to the energization current J in the winding of the electromagnet and is substantially only inversely proportional to the distance $d$ between the electromagnet and the armature rail, on the other hand, the stray-field induction, is, to a first approximation, proportional only to the energization current J. When the signal outputs of the sensors represent precisely the magnetic field intensities, the quotient of both signals is substantially proportional to the distance d between the magnetic members and is substantially independent of the energization current.

Figure 2:
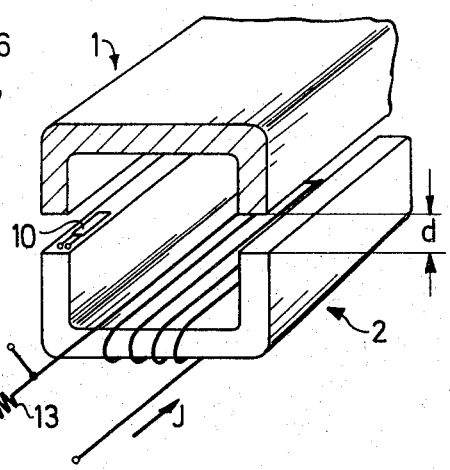
FIG. 2 is a view of a system similar to FIG. 1 except that, where the former has a stray magnetic-field sensor, the system of FIG. 2 is provided with a shunt across which a signal representing the energization current is derived.

In FIG. 2, there has been shown an arrangement whereby a signal proportional to the energization current J is derived across a shunt 13 in the energization circuit of winding 5. In this case, the stray field sensor is rendered super-fluous.

Figure 3:
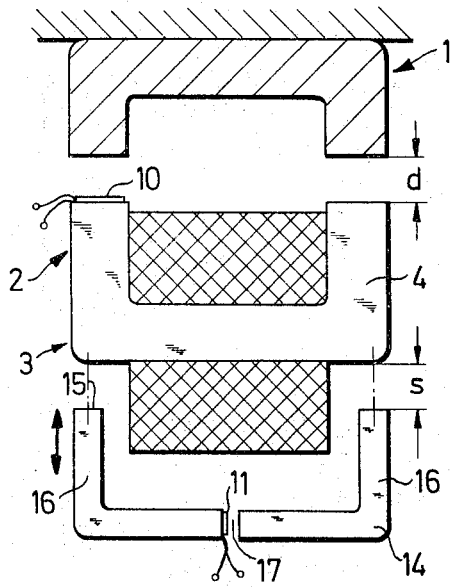
FIG. 3 is an end view, in cross-section through the armature rail, diagrammatically illustrating another arrangement in which an auxiliary magnetic circuit is provided for the stray-field-sensor.

In the arrangement of FIG. 3, a signal proportional to the energization current and, to a first approximation, independent of the main gap spacing, is obtained by the use of an auxiliary magnetic circuit consisting of a magnetically conductive yoke 14 whose arms extend away from the shanks of the magnetic core 3 and bridge the web 4 thereof. The shanks of the yoke 14 are affixed to the core 3 with pole faces 15 of its shanks 16 spaced by an adjustable difference $s$ therefrom. An air gap 17 is provided in this yoke and accommodates the stray field sensor 11. The distance $s$ is adjusted such that $(2s + d') \approx 2d$, where $d'$ is the width of gap 17. In this case the magnetic field detected by the sensor 11 has the same function of energization current as the magnetic field in the gap between the electromagnet 2 and the armature 1.

In the unsaturated state of the system, the sensor outputs $U_1$ and $U_2$ of the main field sensor 10 and the stray field sensor 11, can be represented by the following equalities:

$$U_1 = U_{10} + f_1(J,d)$$
$$U_2 = U_{20} + f_2(J,d)$$

wherein $U_{10}$ and $U_{20}$ are constants and $f_1(J,d)$ and $f_2(J,d)$ are different functions of current $J$ and gap spacing $d$. When one of the functions is primarily a function of current and gap spacing and the other, to a first approximation, is a function only of the current, the quotient may be formed whereby $$d \approx U_2 - U_{20}/U_1 - U_{10} = F(d).$$ In FIG. 4 there has been illustrated the circuit capable of forming the aforementioned quotient and providing the necessary coefficients corresponding to the constants given.

c. Gap-Measurement Circuits and Operation.

Figure 4:
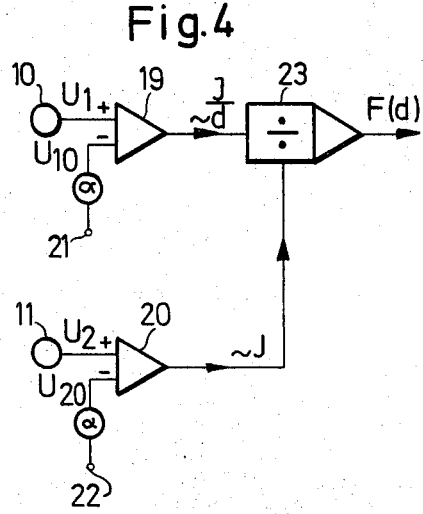
FIG. 4 is a circuit diagram, in block form, corresponding to standard analog-circuit notation illustrating the invention.

In FIG. 4 the input $U_1$ is derived from the sensor 10 while the constant $U_{10}$ is derived from a constant signal 21 applied through a coefficient potentiometer $\alpha$ in accordance with conventional analog practices. The two signals are introduced with positive and negative polarities into the summing amplifier 19 which forms an output signal proportional to current and inversely proportional to gap spacing. Similarly, the adder 20 combines the signal $U_2$ derived from the sensor 11 with the signal $U_{20}$ of a coefficient potentiometer supplied by the constant voltage source 22. The output of this adder is proportional to current. Of course, the current-dependent term may be derived directly across the shunt 13 and the sensor 11 eliminated. The two signals are applied to an electronic divider 23 which provides an output which is the aforementioned function $F(d)$ which, to a first approximation, is proportional to the gap spacing $d$. Although the circuit has been described as an analog system, it should be understood that it can be replaced by additional or hybrid circuits.

FIG. 5 shows an electromagnetic suspension or guide system in which the spacing between the lateral shanks 25 of the electromagnet core 26 is greater than the spacing between the lateral shanks 6 of the armature 1. The magnetic-field incoming surface 27 of one shank and the magnetic-field outgoing surface 28 of the other shank of the electromagnet core 26 are each provided with a main magnetic-field sensor 29. One of the lateral shanks of the magnetic core 26 is also provided with a stray field sensor 31, preferably at a surface 30 at which the stray flux lines enter the core.

In magnetic suspensions of this type, a transverse displacement of the vehicle relative to the armature rail to a distance $\Delta x$ is possible, in addition to a change in the gap spacing $d$. While the sum of the signals obtained from the main magnetic field sensors and disregarding the energization current dependency, is only a function of the gap spacing $d$ and independent of the transverse displacement $\Delta x$, the difference of the outputs of the main field sensor provides an output which is a function of the transverse displacement. The dependency upon transverse displacement and the generation of an output signal which is a function thereof by taking the difference of the outputs of the main field sensors, is greater with the arrangement of FIG. 6 wherein a pair of identically energized electromagnets 33 and 34 are arranged one behind the other and are offset transversely relative to one another and to the armature rail 1. The outermost shanks 35 and 36 of both of these electromagnets are provided with the main magnetic field sensors 29 while a single sensor 31 is provided for the stray magnetic fields along a surface 37 into which the magnetic flux lines of the stray field pass. Here also the stray field sensors may be replaced by a shunt in the energization circuit for the electromagnets or may be incorporated in an auxiliary magnetic circuit as described with reference to FIG. 3.

In operations of the system of FIGS. 5 and 6 below the saturation point, signals $U_3$ and $U_4$ are derived from the main field sensors 29 while a signal $U_5$ is obtained from the main field sensor 31, the signals being represented generally as follows:

$$U_3 = U_{30} + f_3(x + \Delta x, J, d)$$
$$U_4 = U_{40} + f_3(x - \Delta x, J, d)$$
$$U_5 = U_{50} + f_5(J)$$

With small transverse displacements $\Delta x$, as are generally the case with electromagnetic suspension in guide systems, the TAYLOR expansion gives the following approximations:

$$f_3(x+\Delta x,J,d) \approx f_3(x,j,d) + \Delta x \cdot f_3(x,J,d)$$

and $$f_3(x+\Delta x,J,d) \approx f_3(x,J,d) - \Delta x \cdot f_3(x,J,d).$$

The transverse displacement $\Delta x$ is then given as $$\Delta x = U_3 - U_4 - (U_{30} - U_{40})/U_3 + U_4 - (U_{30} + U_{40}).$$

The relationship between the signals can be then manipulated to eliminate $\Delta x$ and yields the following equality:

$$U_5 - U_{50}/U_3 + U_4 - (U_{30} + U_{40}) = f_5(J)/2f(x,J,d).$$

Since $x$ is substantially constant, $f_3(x, J,d)$ is proportional to $J/d$ while $f_5(J)$ is thus a function only of current. The proportionality in terms of the gap spacing $d$ is then given by $$d \approx U_5 - U_{50}/U_3 + U_4 - (U_{30} + U_{40}),$$

and it is possible using the circuit of FIG. 7 to obtain an output which is a function of the gap spacing $f(d)$. The output $\Delta x$ can, of course, be used to control another electromagnet system or to signal the degree of transverse displacement to the vehicle operator. The use of identical main magnetic field sensors 29 for both poles makes $U_{30} \approx U_{40}$.

In the system of FIG. 7, the outputs of the main field sensors 29 are applied to positive inputs of the adder 39 together with the coefficient $2U_{30}$ derived from a coefficient potentiometer energized by the constant-signal source 40. This signal is applied through a negative input to the adder 39 which forms, as described, an output which is a function of current and gap spacing. The output of the adder 43, whose inputs derive from the stray-field sensor 31 and a coefficient potentiometer, is proportional to the current $J$ and is applied to the divider 45 together with the same signal from the adder 39 to yield the output function $f(d)$ as already described. Another adder 42 forms the difference between the outputs of main field sensors and applies the output signal to the divider 41 which also receives the output signal from the adder 39. The divider thus yields an output signal proportional to $\Delta x$ for further use. Of course, the circuitry here too may use digital or hybrid elements.

d. Feedback Control System

Figure 9:
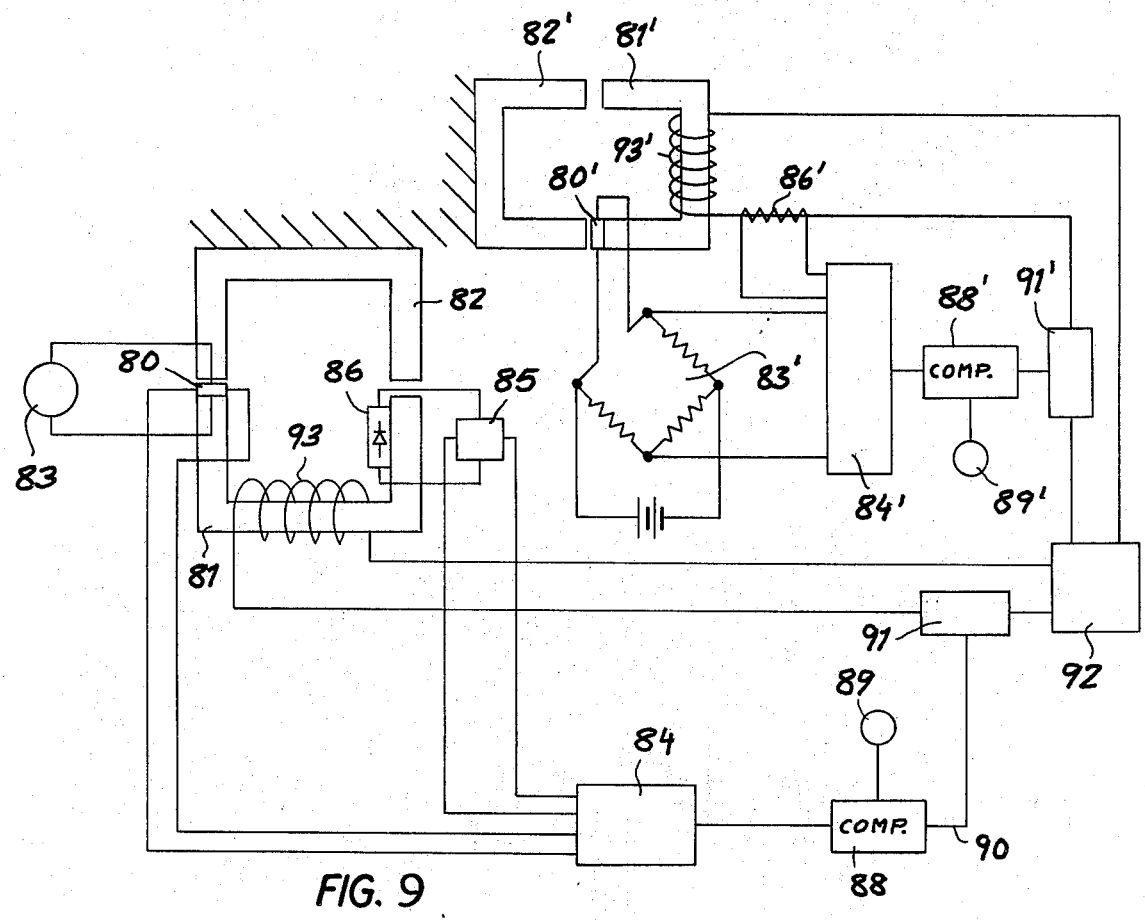
FIG. 9 is a diagram illustrating other features of the invention.

In FIG. 9 there is shown an arrangement whereby the main field sensor 80 of the electromagnetic suspension 81, 82 is of the Hall-effect type and is electrically energized by a source 83 to yield an output which is applied to the circuit 84. Another input to this circuit, which may have the configuration of the system of FIG. 4, is derived from a circuit 85 including the magnetic diode 86 forming a stray-field detector. The output of circuit 84 is, of course, a function of the gap spacing and is applied to the comparator 88 which also receives a set point or reference input at 89 to produce an error signal at 90. The error signal is applied to a current controller 91 in circuit with the main current-supply source 92 and the electromagnet coil 93. The optimum gap is thus automatically maintained.

In addition, the guide electromagnet arrangement yay comprise an electromagnet system 81', 82', the coil 93' of which is energized by the source 92 through a controller 91'. The latter receives an error signal from a comparator 88' having a set-point input 89' and a further input which is a function of the lateral gap spacing derived from a circuit 84' such as that shown in FIG. 4. One input for this circuit is derived from the shunt 86' in circuit with the coil 93' while the other input is obtained from a bridge 83' connected across the field-plate sensor 80' to measure the ohmic resistance thereof.

We claim:

1. A method of measuring the gap spacing and the relative transverse displacement of an electromagnetic core from an armature spacedly juxtaposed therewith across a gap traversed by a main flux path closed through said armature upon electrical energization of a coil on said core by an energization current, whereby a stray flux approximately proportional to the amplitude of said current is generated at said core, said armature extending longitudinally and being of U-profile with shanks turned toward said core, said core being of U-configuration with spaced apart poles reaching toward said armature, each of said poles being provided with a respective main magnetic field sensor, said method comprising the steps of:
 a. additively combining the outputs of said sensors to yield a first output constituting a function of the gap spacing and the intensity of said energization current and approximately proportional to the magnetic field intensity of said main flux path;
 b. subtractively combining the outputs of said sensors to yield a second output;
 c. forming a a quotient signal signal of said first and second outputs and proportional to a relative transverse displacement of said core and said armature;
 d. deriving a third output constituting a function of said energization current; and
 e. forming a quotient signal of said first and third outputs which is substantially proportional to the spacing of said gap and independent of the amplitude of said energization current.

2. In a system for measuring the gap spacing and the relative transverse displacement of an electromagnet core from an armature spacedly juxtaposed therewith across a gap traversed by a main flux path closed through said armature upon electrical energization of a coil on said core by an energization current whereby a stray flux approximately proportional to the amplitude of said current is generated at said core, said armature extending longitudinally and being of U-profile with shanks turned toward said core and said core being of U-configuration with spaced apart poles reaching toward said armature, each of said poles being provided with a respective main magnetic field sensor, the improvement which comprises in combination therewith:
 first electronic circuitry including:
  first means for additively combining the outputs of said sensors to yield a first output constituting a function of the gap spacing and the amplitude of said energization current and approximately proportional to the magnetic flux intensity of said main flux path;
  second means for subtractively combining the outputs of said sensors to yield a second output;
  an electronic divider connected to said first and second means for forming a quotient signal of said first and second outputs proportional to relative transverse displacement of said core and said armature;
 second electronic circuitry including means for deriving a third output constituting a function of said energization current; and
 an electronic divider connected to said first and second electronic circuitry for forming a quotient signal from said first and third outputs and substantially proportional to the spacing of said gap and independent of the amplitude of said energization current.

3. The improvement defined in claim 2 wherein said second electronic circuitry includes:
 a shunt connected in series with said coil; and
 means for taping a voltage proportional to the amplitude of said current across said shunt.

4. The improvement defined in claim 2 wherein said second electronic circuitry includes a magnetic-field sensor disposed in the path of said stray flux.

5. The improvemet defined in claim 4, further comprising means forming an auxiliary flux path traversed by said stray flux and independent of said armature, said auxiliary flux path including a secondary gap, said magnetic field sensor disposed in the path of said stray flux being located in said secondary gap.

6. The improvement defined in claim 5 wherein said auxiliary flux path includes at least one further gap traversed by said stray flux and means for adjusting the spacing of said further gap.

7. The improvement defined in claim 2 wherein at least one of said sensors includes a Hall-effect crystal.

8. The improvement defined in claim 2 wherein at least one of said sensors includes a magnetic diode.

9. The improvement defined in claim 2 wherein at least one of said sensors includes a field plate.

10. The improvement defined in claim 2 wherein said core has poles spaced apart by a space greater than that between said shanks.

\* \* \* \* \*